États-Unis Patent Office 2,908,792
Patented Oct. 13, 1959

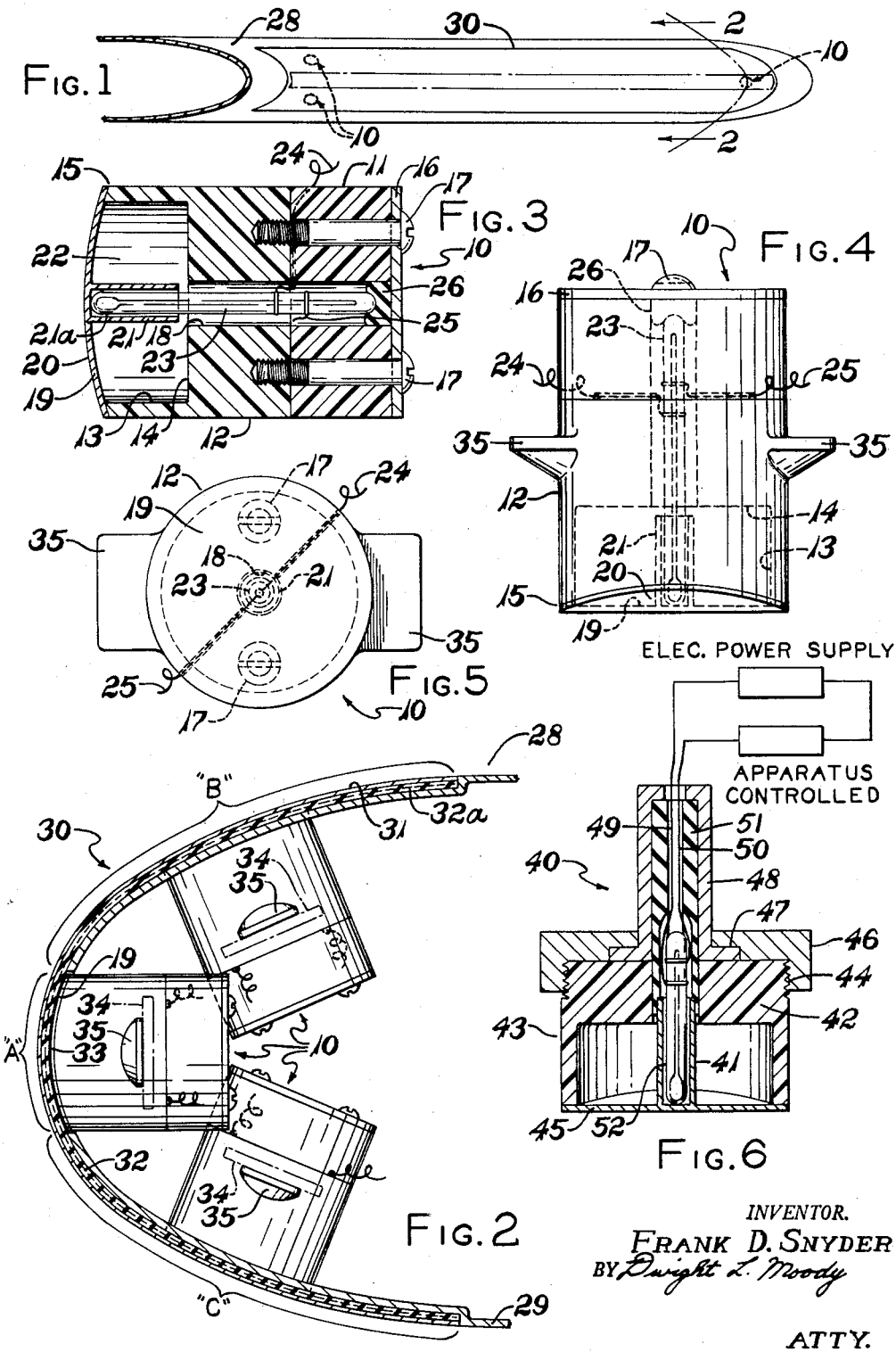

2,908,792

FAST RESPONSE THERMAL SWITCH

Frank Doane Snyder, Akron, Ohio, assignor to The B. F. Goodrich Company, New York, N.Y., a corporation of New York Application May 9, 1957, Serial No. 658,139

9 Claims. (Cl. 219—20)

The invention relates to switches for electrical circuits and especially to electrical switches of the thermally operated type capable of fast response to surface temperature changes.

In applications where a thermal switch is required to open and to close an electrical circuit in response to changes in temperature of a surface such, for example, as a metal or a non-metallic surface of an electrically heated covering adapted for removing ice from airfoil, it is essential that the switch have a low thermal mass and a high rate of response, so that the temperature of the heated covering can be controlled within the desired limits. The difficulties of providing a suitable thermally operated switch are increased when the switch must be of a simple on-off type and mounted interiorly of the airfoil, and when no electronic amplifiers and no sensitive relays can be used with the switch for circuit control purposes.

These limitations eliminate devices such as thermocouples, thermistors, and temperature-sensing elements placed in the ambient air flow over the airfoil. It has been found that prior thermal switches of the creeping thermal expansion element type, and of the snap-action bimetallic type, and even of the ordinary mercury expansion type are not suitable for the intended purpose, because of vibration troubles, or too slow a rate of response, or too great a temperature differential between the opening and the closing positions.

An object of the invention is to provide an improved thermally operated switch with minimum thermal mass i.e. heat capacity per unit area, and maximum sensitivity and rate of response to changes in temperature of a surface to be measured.

Other objects of the invention are to provide for making and breaking an electrical circuit by the thermal switch without requiring electronic amplifiers or sensitive relays; to provide for a rate of temperature change by the thermal switch closely approximating the rate of temperature change of a surface subject to heating and/or cooling, especially a surface of an electrically heated portion of or covering for an airfoil; to provide for intimate heat-transferring relation of a heat-collecting portion of the switch to the said surface; to provide for collecting heat substantially directly from a relatively extensive surface area and transferring the collected heat with little or no heat loss to thermally responsive means in the switch; to provide for conformance of the said heat-collector portion with the said surface; to provide for controlling effectively the heating of a leading edge portion of an airfoil; and to provide for simplicity of construction, convencience of manufacture and for effectiveness and reliability of operation.

These and other objects and advantages of the invention will be apparent from the following description.

In the accompanying drawings which form a part of the specification and in which like numerals are employed throughout to designate like parts:

Fig. 1 is a view showing thermal switches within an electrically heated leading edge portion of an airfoil and constructed in accordance with and embodying the invention, parts being broken away and in section;

Fig. 2 is a sectional view taken along line 2—2 in Fig. 1 showing the arrangement of thermal switches within the heated leading edge portion, parts being broken away and in section;

Fig. 3 is a longitudinal cross-sectional view of a thermal switch;

Fig. 4 is an elevational view of the thermal switch;

Fig. 5 is a bottom view of the thermal switch and;

Fig. 6 is a view showing a modified construction of the thermal switch and its connection in an electrical circuit.

The illustrative embodiment of a thermal switch 10 of the fast response type shown in Figs. 1 to 5, inclusive, includes a shielding or protective body 11 of stiff, heat-insulating material such, for example, as a thermosetting phenolic resin or other suitable rigid plastic material adapted for molding purposes and resistant to softening under heat after curing and molding. The protective body 11 may be of cylindrical or other suitable external shape for the intended purpose and is split or divided laterally at a position intermediate its length for convenience of manufacture and servicing or repair. This arrangement provides a lower or hollow end portion 12 of the body with a continuous annular side wall 13 of desirably uniform thickness and an apertured end wall 14 integrally united with the side wall and spaced from the end 15 of the hollow end portion. The side wall 13 is of minimum thickness consistent with strength requirements so as to minimize heat loss into the wall and heat storage in the wall. The remainder or upper portion of the protective body 11 is seated against and detachably secured to the hollow end portion 12 by means of a pair of spaced-apart headed attaching fasteners or machine screws 17, 17 threadedly engaging the end wall 14 of the hollow end portion, as shown especially in Fig. 3. Preferably, the hollow end portion 12 is circular in cross-sectional shape and of uniform outside diameter, although not necessarily limited thereto.

The aperture 18 in the body extends centrally and entirely through the end wall 14 and may continue through the remainder of the body 11, thereby providing a central bore desirably of uniform diameter extending longitudinally through the body 11. The end of the aperture or bore 18 opposite the end wall 14 is closed by the continuous rigid cover 16 of suitable plastic or metal material so as to minimize the entrance of ambient air into the bore, which cover is held in place by the headed screws 17, 17. The split construction of the body 11 facilitates servicing the switch.

The invention provides a heat-collector structure including a continuous base portion 19 of stiff, heat-conducting metal material and generally plate-like form, which base portion 19 at its entire outer periphery is secured in sealing relation to the annular shielding side wall 13 at the end 15 of the hollow end portion 12 and conforms to the outer peripheral configuration of the latter. The base portion 19 may, if desired, be of flat configuration for some applications, but for application to the electrically heated leading edge portion of an airfoil, as shown in Figs. 1 and 2, the base portion is of arcuate configuration in a direction laterally of the protective body 11, whereby the base portion 19 has a curved external surface 20 adapted for conformance against an internal surface of the said leading edge portion in intimate heat-transferring relation thereto, as shown especially in Fig. 2. The base portion 19 is of such composition and thickness preferably uniform thickness, throughout its area as to provide for minimum heat-storage capacity per unit of area (density×thickness× specific heat of material).

The continuous base portion 19 may be secured and sealed to the continuous annular side wall 13 by means of a suitable liquid form of an acrylonitrile butadiene copolymer phenolic resin adhesive which can be heated and cured at about 300° F. This arrangement provides a dead air insulating space 22 within the hollow end portion 12. The base portion 19 may be of aluminum, magnesium, copper, iron, silver, or other suitable alloy metal having the desired heat-sensitivity and heat-transfer properties and resistance to puncture. Good results have been obtained with the base portion being formed, for example, of magnesium alloy with a one inch (1″) outside diameter and a thickness of about .015 inch, when the rigid plastic cylindrical body 11 has an outside diameter of one inch and the annular shielding side wall 13 of the hollow end portion 12 has a thickness of about 1/16 inch.

The heat-collector structure also includes a hollow or tubular portion 21 of suitable stiff, heat-conducting metal material disposed perpendicularly to and centrally of the base portion 19 in integrally united relation therewith and projecting away from the internal surface of the base portion toward the apertured end wall 14. Desirably, the hollow portion 21 is of uniform outside diameter and inside diameter and of uniform wall thickness and terminates adjacent but short of the apertured end wall 14 as shown in Fig. 3. Good results have been obtained for the one inch (1″) diameter body 11 and the one inch (1″) diameter magnesium base portion 19, when the hollow portion 21 is formed of magnesium alloy and has a .160 inch outside diameter and a .104 inch inside diameter with a height of about 3/8 inch. A hollow portion 21 of these particular dimensions has a uniform diameter bore extending to within about .015 inch of the external face 20 of the base portion 19 so that the latter is of substantially uniform thickness throughout for uniformity of heat-conductance.

It will be noted that the hollow end portion 12 completely encloses the hollow portion 21 with the annular side wall 13 in laterally spaced relation to the latter portion 21. Thus, the dead air space 22 surrounding the hollow portion 21 functions as a heat-insulator for the heat-collector structure and has minimum heat-storage capacity.

It is essential that the heat-collector structure comprising the base portion 19 and the hollow portion 21, be of a suitable heat-conducting composition and of sufficient dimensions such that it changes in temperature at a rate substantially equal to or closely approximating that of the temperature change of a surface against which the base portion is seated in intimate heat-transferring relation thereto. For example, when of circular shape, the base portion 19 is of relatively large diameter i.e. in the order of about six times larger as compared to the outside diameter of the hollow portion 21, so that the base portion functions effectively as a heat-collector, while its greatly reduced thickness (.015) as compared to its diameter (1″), hence minimum mass, permits the temperature of the base portion 19 to increase and decrease at a rapid rate. Thus, substantially all the collected heat is quickly conducted and transferred directly to the wall material of the hollow portion 21. The hollow end portion 12 of the protective body not only serves as a firm supprt for the heat-collector structure, but its side wall 13 and end wall 14 protect and insulate the upright hollow portion 21 from the ambient air surrounding the switch, which air may be at a higher or a lower temperature than that of the surface from which the heat is being collected. The dead air space 22 (little or no air movement) surrounding the hollow portion 21 further acts as an insulator against the loss of heat from the heat-collector structure to the ambient air.

The thermal switch 10 includes thermally responsive means 23 including an electrically conductive, thermally expansive material disposed within the projecting hollow portion 21 and within the protective body 11, which thermally responsive means is in intimate heat-transferring relation to the heat-collector structure including the wall of the hollow portion 21. The thermally responsive means 23 includes a glass thermometer of uniform outside diameter throughout substantially its entire length and having the usual bulb end part and a capillary tube enclosing a suitable quantity of the electrically conductive, thermally expansive material such, for example, as liquid mercury and the like. The glass thermometer 23 has an outside diameter such that a slight clearance of not more than one to several thousandths of an inch exists between the wall of the hollow portion 21 and the wall of the thermometer 23 at its bulb region, which clearance space is desirably filled with a suitable silicone grease 21a containing finely divided aluminum powder for heat-conducting purposes. This arrangement facilitates the rapid transference of the collected heat from both the base portion 19 and the hollow portion 21 to and from the mercury in the thermometer at its bulb end region.

A first electrical conductor means 24 or lead-in wire or terminal is carried by the protective body 11 and has a portion which pierces the glass wall of the thermometer 23 so as to be brought into contact with the mercury in the capillary tube at a position corresponding to a temperature well below that at which the electrical circuit through the switch is to be completed. A second electrical conductor means 25 carried by the body 11, also has a portion piercing the glass wall of the thermometer for contacting the mercury in the capillary tube at a relatively higher position corresponding to the height to which the mercury will be expanded by the collected heat when the measured temperature is that at which the electrical circuit through the switch is to be completed. Thus, the electrical conductor means include portions extending at spaced-apart positions in the protective body into the path of the thermally expansible material or mercury for contact therewith to thereby make or break an electrical circuit in response to changes in temperature produced in the heat-collector structure by the heated surface against which the base portion 19 is seated. Desirably, the electrical conductor means 24, 25 extend in diametrically opposite directions through shallow grooves in the body 11 at the divide therein, as shown especially in Figs. 3 to 5, inclusive.

Means for maintaining the bulb end of the thermometer 23 in contact with and resiliently pressed against the base portion 19 of the heat-collector structure may be a solid cylindrical support member 26 of resiliently deformable natural or synthetic rubber, or other rubber-like material which may be disposed against the other end of the thermometer and held in place by the cover 16. The resilient deformation of the member 26 axially urges the thermometer continuously toward the base portion 19. The hollow portion 21 of the heat-collector structure and the support member 26 cooperate to prevent wobble and axial tilting of the thermometer 23.

The particular arrangement shown in Figs. 1 and 2 utilizes a plurality of the thermal switches 10, 10 to control the temperature of the external surface of the electrically heated leading edge portion of an airfoil 28 by virtue of measuring directly the temperature of an inner surface of said portion. At least one thermal switch is mounted at the immediate leading edge region designated by the letter "A," and similar thermal switches, except for their temperature setting, are mounted at the upper and the lower sides, that is the rear ice-shedding areas of the electrically heated leading edge portion designated by the letters "B" and "C," respectively.

The airfoil 28 including its heated leading edge portion has a thin skin or cover 29 of aluminum, magnesium or other strong, light-weight metal, which cover 29 may be recessed at the leading edge to accommodate an electrically heated protective covering or shoe 30 as shown especially in Fig. 2. The protective covering 30 may be of the type shown in the Luke Patent No. 2,741,-692 or the Vrooman Patent No. 2,762,897. However, the particular covering 30 shown especially in Fig. 2 has a construction and arrangement providing a thin metal outer skin 31 bonded to and overlying a rigid plastic body 32 having intermediate its thickness ribbon-like heating elements 32a, 32a of electrical resistance material arranged to give the desired heating effect at the immediate leading edge region "A" and at the rearward ice-shedding areas "B" and "C," respectively. The rigid plastic body 32 is also bonded to the underlying thin aluminum cover 29 of the airfoil.

The protective covering 30 at the immediate leading edge region "A" may be heated continuously so that this part of the covering 30 constitutes a parting strip continuously maintained free of ice accumulation. The rearward portions of the protective covering 30 at the rearward ice-shedding areas "B" and "C," respectively, may be heated in a cyclical manner to loosen the ice deposited upon the rearward portions of the protective cover 30 for removal by the ambient flow of air.

The thermal switch 10 for the parting strip area at the immediate leading edge region may, if desired, be disposed with the external face 20 of its base portion 19 fitted conformingly against the inner face of the metal cover 29 of the airfoil. However, good results and improved sensitivity have been obtained with the thermal switch 10 mounted as shown in Fig. 2, wherein the external face 20 of the base portion 19 is seated against the inner face of the rigid plastic body 32 of the protective covering 30 in intimate heat-transferring relation thereto. Preferably, a very thin film 33 of a suitable silicone grease with finely divided aluminum powder therein is interposed between the external face 20 of the base portion 19 and the inner face of the rigid plastic body 32 for continuity and uniformity of heat-transference to the base portion 19. To these ends, the cover 29 of the airfoil 28 has a suitably sized aperture or opening therethrough to accommodate therein the hollow end portion 12 of the thermal switch 10. Preferably, the cover 29 of the airfoil is also cut away at the upper and lower shedding areas "B" and "C," respectively, to accommodate the thermal switches 10, 10 disposed within the airfoil at these areas, as shown in Fig. 2.

The thermal switches 10, 10 are pressed firmly and resiliently against the rigid plastic body 32 of the protective cover 30 as by means of suitable leaf spring elements 34, 34 seating against projecting lugs 35, 35 on the end portion 12 of the switch body and extending therefrom longitudinally or spanwise along the leading edge to a position spaced from the opening in the cover 29 and fixedly attached thereto as by rivets (not shown) or other suitable manner. This mounting arrangement facilitates maintaining the thermal switches against the protective covering 30 but permits convenient removal of the thermal switches as for servicing purposes.

In the operation of the thermal switch 10 mounted, for example, at the immediate leading edge region "A" and connected in a suitable electrical circuit (for example, of the type illustrated in Fig. 6) of the apparatus controlled including the protective covering 30, the entire base portion 19 of the heat-collector structure collects heat from the inner face of the protective covering 30 and conducts and transmits the collected heat to the wall of the hollow portion 21 with little or no thermal storage and heat loss in the heat-collector structure which latter portion 21 then transmits this heat to the thermally responsive means 23, that is, to the mercury contained in the bulb part of the thermometer 23. Under an increasing temperature condition of the protective covering 30 including its inner face, the mercury ascends from the bulb through the capillary tube of the thermometer and contacts the first conductor means 24 after which it continues until the mercury contacts the second conductor means 25. The mercury functions as an electrical connection between the first and the second conductor means to make and break the electrical circuit through the switch. Since the second conductor means 25 is positioned at a temperature setting substantially corresponding to the temperature of the inner face of the protective covering 30 at which temperature the flow of heating current to the heating elements 32a in parting strip of the protective covering is to be shut off, the completion of the electrical circuit through the switch functions to operate the apparatus controlled so as to break the electrical circuit for the heating elements in the parting strip "A."

The thermal switch not only responds rapidly to an increase but also to a decrease in temperature of the protective covering 30 by virtue of the heat-collector structure changing in temperature at a rate equaling or closely approximating that of the temperature change of the inner face of the protective covering. When the cover 29 of the airfoil has an aperture therethrough as shown in Fig. 2, the thermal mass of the base portion 19 and the hollow portion 21 and the thermally responsive means 23 may approximately equal the thermal mass of the amount of metal removed from the cover 29 to accommodate the switch 10, whereby the temperature of the inner face of the protective covering contacting and being measured by the switch corresponds to the temperature of said inner face at its areas directly adjacent the switch. This makes it possible to avoid excessively high temperatures tending to loosen the adhesive bond between the protective covering and the airfoil cover 29.

When the flow of heating current to the heating element in the parting strip "A" of the protective covering 30 is shut-off by virtue of the operation of the switch 10, the flow of ambient air across the leading edge rapidly reduces the temperature of the protective covering 30 including its inner face, thereby lowering the temperature of the heat-collector structure of the switch. This causes the mercury in the capillary tube of the thermometer 23 to flow back into the bulb of the thermometer and out of contact with the second conductor means 25. This breaks the electrical circuit through the switch whereby the apparatus controlled functions to permit the flow of heating current to the heating elements 32a in the parting strip of the protective cover.

The thermal switches 10, 10 mounted within the airfoil at the respective rearward ice-shedding areas "B" and "C" function in a substantially similar manner even though the protective covering 30 is heated cyclically at these areas. These thermal switches 10, 10 in the rearward ice-shedding areas have different temperature settings from that of the switch 10 at parting strip "A," nevertheless they likewise operate to cut off the flow of heating current to the heating elements 32a, 32a in the rearward portions of the protective covering 30 and prevent loosening of the bond between the covering and the airfoil cover 29 due to excessively high temperatures, and to assure the desired temperature of the outer skin 31 of the covering. The rearwardly disposed thermal switches 10, 10 are connected in the electrical circuit such that they break the electrical circuit of the heating elements when the desired maximum temperature of the protective covering 30 is reached.

When the thermal switch 10 is mounted with its base portion 19 directly against the inner face of the metal airfoil cover 29 rather than against the inner face of the protective covering 30, it is desirable that the thickness of the airfoil cover 29 be reduced as much as possible at the area immediately contacted by the base portion 19 so as to minimize the heat storage capacity of the metal airfoil cover at said area. This facilitates a close approximation of the heat collected by the switch as compared to that which it would collect if the base portion 19 were seated directly against the inner face of the protective covering 30.

When the protective covering 30 is made of vulcanized flexible rubber material, the rubber material adjacent the electrical resistance heating elements will char at objectionably high temperatures. The thermal switch 10 not only facilitates the desired outer surface temperature of the rubber covering, but assures maintaining the heating elements at a temperature sufficiently low to avoid charring the surrounding rubber material.

The modified construction 40 of the thermal switch includes the essential features of the switch 10 including the heat-collector structure and the hollow end portion of the divided protective body and the thermally responsive means or mercury thermometer. However, the hollow or tubular portion 41 of the heat-collector structure extends a slight distance into the aperture in the end wall 42 of the hollow end portion 43 which portion is provided with external threads 44, as shown in Fig. 6. The base portion 45 of the heat-collector structure may have a laterally curved configuration in cross-section like that of the base portion 19 of the switch 10. The remainder of the protective body of the thermal switch 40 includes a suitable flanged collar 46 of steel, aluminum, or other suitable metal internally threaded to engage the external threads 44 of the hollow end portion 43. The collar 46 as shown in Fig. 6, contacts an outward end flange 47 of a tubular body portion or member 48 of suitable metal material to hold the tubular member 48 in position against the hollow end portion 43. The bore in the tubular member is aligned with the aperture in the hollow end portion 43. The other or upper end of the tubular member 48 has a smaller opening for accommodating the first and second conductor means 49, 50 respectively connected to the mercury thermometer 52. A tubular insulating member 51 of silicone rubber material is disposed within the bore in the tubular member 48 and within the aperture in hollow end portion 43 and has its lower end in overlapping relation to the upper wall part of the hollow portion 41 of the heat-collector structure to resist wobble and tilting of the thermometer 52 and to hold the thermometer 52 in position in the hollow portion 41. The thermally responsive means 52 or thermometer extends from the base portion 45 through the hollow portion 41 of the heat-collector structure and into the aperture in the hollow end portion 42, and is enclosed and shielded by the protective body of the switch 40. A suitable silicone grease with aluminum powder therein may be in the clearance space between the thermometer 52 and the hollow portion 41.

The thermal switch 40 functions like the switch 10 and may be connected to an electrical circuit (shown schematically in Fig. 6) which includes the required electrical power supply and apparatus controlled. This thermal switch 40 like the switch 10 measures effectively and is rapidly responsive to the temperature of a surface against which the base portion 45 of the heat-collector structure is seated in intimate heat-transferring relation.

Variations may be made without departing from the scope of the invention as it is defined in the following claims.

I claim:

1. Apparatus of the character described comprising in combination an airfoil including an electrically heated portion extending across and to the sides of the immediate leading edge portion of said airfoil, and a fast response thermal switch electrically connected to said heated portion for controlling heating current therefor and being mounted interiorly of said airfoil and said switch comprising a heat-collector structure having a base plate portion with a face thereof conforming to and seated against an inner surface of said heated portion in intimate heat-transferring relation thereto and a hollow portion projecting from the other face of said base plate portion and spaced from the periphery thereof, said heat-collector structure being a composition and sufficient dimensions such that it changes in temperature at a rate approximating that of the temperature change of said inner surface of said heated portion, a protective body including a hollow end portion united with said base plate portion at its periphery and entirely surrounding the projecting hollow portion in laterally spaced relation thereto, a thermally responsive means including an electrically conductive thermally expansive material disposed within said projecting hollow portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means providing an electrical circuit through said switch for the heating current for the airfoil heated portion and making and breaking such circuit in rapid response to temperature changes of said inner surface of such heated portion by virtue of said heat-collector structure changing in temperature at said rate approximating that of said inner surface of said airfoil heated portion.

2. Apparatus of the character described comprising in combination an airfoil including an electrically heated portion of generally arcuate shape in cross-section extending across and to the sides of the immediate leading edge portion of said airfoil, and a fast response thermal switch electrically connected to said heated portion for controlling heating current therefor and being mounted interiorly of said airfoil and said switch comprising a heat-collector structure having a base plate portion of generally arcuate sectional form and substantially uniform thickness with a face thereof conforming to and seated against an inner surface of said heated portion in intimate heat-transferring relation thereto and a hollow cylindrical portion integral with and projecting from the other face of said base plate portion and spaced from the periphery thereof, said heat-collector structure being of a composition and sufficient dimensions such that it changes in temperature at a rate approximating that of the temperature change of said inner surface of said heated portion, a protective body including a hollow end portion united in sealed relation with said base plate portion at its periphery and entirely surrounding the projecting cylindrical portion in laterally spaced relation thereto, a thermally responsive means including an electrically conducive thermally expansive material disposed within said projecting cylindrical portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means providing an electrical circuit through said switch for the heating current for the airfoil heated portion and making and breaking such circuit in rapid response to temperature changes of said inner surface of such heated portion by virtue of said heat-collector structure changing in temperature at said rate approximating that of said inner surface of said airfoil heated portion.

3. Apparatus of the character described comprising in combination an airfoil with a leading edge having an opening therethrough, an electrically heated protective covering extending across and to the sides of the immediate leading edge portion of said airfoil and secured to said leading edge in contacting conformance therewith and spanning said opening, and a fast response thermal switch electrically connected to said protective covering for controlling heating current therefor and being mounted interiorly of said leading edge and extending through said opening therein, said thermal switch comprising a heat-collector structure having a base plate portion with a face thereof seated conformingly against an inner surface of said covering in intimate heat-transferring relation thereto and occupying substantially the entire area of said opening and a hollow portion projecting from the other face of said base plate portion and spaced from the periphery thereof, said heat-collector structure being of a composition and sufficient dimensions such that it changes in temperature at a rate approximating that of the temperature change of the said inner surface of said covering, a protective body including a hollow end portion extending into said opening and united with said base plate portion at its periphery and entirely surrounding the projecting hollow portion in laterally spaced relation thereto, a thermally responsive means including an electrically conductive thermally expansive material disposed within said projecting hollow portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means providing an electrical circuit through said switch for the heating current for said protective covering and making and breaking such circuit in rapid response to temperature changes of said inner surface of the protective covering by virtue of said heat-collector structure changing in temperature at said rate approximating that of said inner surface of said protective covering.

4. Apparatus for preventing the accumulation of ice upon an airfoil, said apparatus comprising an airfoil with a leading edge of sheet-like stiff metal material of generally arcuate sectional shape having an opening therethrough, an electrically heated protective covering extending across and to the sides of the immediate leading edge portion of said airfoil and secured conformingly to the exterior face thereof and spanning said opening, and a fast response thermal switch electrically connected to said protective covering for controlling heating current therefor and being mounted interiorly of said leading edge and extending through said opening therein, said thermal switch comprising a heat-collector structure having a base plate portion of substantially uniform thickness and generally arcuate sectional form with a face thereof seated conformingly against an inner surface of said covering in intimate heat-transferring relation thereto and occupying substantially the entire area of said opening and a hollow portion integral with and projecting from the other face of said base plate portion and spaced from the periphery thereof, said heat-collector structure being of a composition and sufficient dimensions such that it changes in temperature at a rate approximating that of the temperature change of the said inner surface of said covering at said opening, a protective body including a hollow end portion extending into said opening and united with said base plate portion in sealed relation thereto at its periphery and entirely surrounding the projecting hollow portion in laterally spaced relation thereto, a thermally responsive means including an electrically conductive thermally expansive material disposed within said projecting hollow portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means providing an electrical circuit through said switch for the heating current for said protective covering and making and breaking such circuit in rapid response to temperature changes of said inner surface of the protective covering by virtue of said heat-collector structure changing in temperature at said rate approximating that of said inner surface of said protective covering.

5. A fast response thermal switch for contact with a surface subject to changes in temperature, said thermal switch comprising a protective body including a hollow end portion with a continuous side wall or stiff heat-insulating material and an apertured end wall of said material integrally united with said side wall and spaced from the end of said end portion, a heat-collector structure including a base portion of stiff material and generally plate-like form secured in sealing relation to said side wall at said end of said end portion and presenting an external face for seating conformingly against the said surface in intimate heat-transferring relation thereto, said heat-connector structure including a hollow portion of stiff material integrally united with and projecting away from the internal face of said base portion toward said end wall and laterally spaced from said side wall of the body, said heat-collector structure being of a heat-conducting composition and sufficient dimensions such that it changes in temperature at a rate approximating that of the temperature change of the said surface, a thermally responsive means including an electrically conductive thermally expansive material within said protective body and having a portion within said hollow portion of said heat-collector structure in intimate heat-transferring relation thereto and a second portion projecting into the aperture in said end wall with a part of said body in supporting heat-shielding relation to the projecting second portion of said means, and a first and a second electrical conductor means carried by said protective body and having portions extending at spaced-apart positions therein into the path of said thermally expansible material for contact therewith, said first and second electrical conductor means and said thermally responsive means providing an electrical circuit through the switch and making and breaking such electrical circuit in rapid response to changes in temperature produced in said heat-collector structure by the said surface.

6. A fast response thermal switch for contact with a surface subject to changes in temperature, said thermal switch comprising a protective body including a generally cylindrical hollow end portion with a continuous side wall of stiff heat-insulating material and an apertured end wall of said material integrally united with said side wall and spaced from the end of said end portion, a heat-collector structure including a generally circular base portion of stiff material and generally plate-like form secured in sealing relation to said side wall at said end of said end portion and presenting an external face of a configuration adapted for seating conformingly against said surface in intimate heat-transferring relation thereto, said heat-collector structure including a tubular portion of stiff material integrally united with and projecting away from the internal face of said base portion toward said end wall and radially spaced from said side wall of the body, said heat-collector structure being of a heat-conducting composition and sufficient dimensions such that it changes in temperature at a rate approximating that of the temperature change of the said surface, a thermally responsive means including an electrically conductive thermally expansive material within said protective body and having a portion within said tubular portion of said heat-collector structure in intimate heat-transferring relation thereto and a second portion projecting into the aperture in said end wall with a part of said body in adjacent supporting heat-shielding relation to the projecting second portion of said means, and a first and a second electrical conductor means carried by said protective body and having portions extending at spaced-apart positions therein into the path of said thermally expansible material for contact therewith, said first and second electrical conductor means and said thermally responsive means providing an electrical circuit through the switch and making and breaking such electrical circuit in rapid response to changes in temperature produced in said heat-collector structure by the said surface.

7. A fast response thermal switch for contact with a contoured surface subject to changes in temperature, said thermal switch comprising a protective body including a cylindrical hollow end portion with a continuous side wall of stiff plastic heat-insulating material and an apertured end wall of said material integrally united with said side wall and spaced from the end of said end portion, a heat-collector structure including a circular base portion of generally plate-like form secured in sealing relation to said side wall at said end of said end portion and presenting an external face of a configuration adapted for seating conformingly against said surface in intimate heat-transferring relation thereto, said heat-collector structure including a tubular portion integrally united with and projecting away from the internal face of said base portion toward said end wall and uniformly spaced radially from said side wall of the body, said heat-collector structure being of a stiff metallic heat-conducting composition and sufficient dimensions such that it changes in temperature at a rate approximating that of the temperature change of the said surface, a thermally responsive means including an electrically conductive thermally expansive material within said protective body and having a portion within said tubular portion of said structure in intimate heat-transferring relation thereto and a second portion projecting into the aperture in said end wall with a part of said body in adjacent supporting heat-shielding relation to the projecting second portion of said means, and a first and a second electrical conductor means carried by said protective body and having portions extending at spaced-apart positions therein into the path of said thermally expansible material for contact therewith, said first and second electrical conductor means and said thermally responsive means providing an electrical circuit through the switch and making and breaking such electrical circuit in rapid response to changes in temperature produced in said heat-collector structure by the said surface.

8. A fast response thermal switch comprising a heat-collector structure including a thermally conductive base plate portion and a hollow thermally conductive portion integral with and projecting from a face of said base plate portion and spaced from the periphery thereof, a protective body including a hollow end portion united with said base plate portion at its periphery and entirely surrounding the projecting hollow portion in laterally spaced relation thereto, said protective body having a lower heat conductivity than that of said base plate portion, a thermally responsive means including an electrically conductive thermally expansive material disposed within said projecting hollow portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means constitute an electrical circuit through the switch and make and break such electrical circuit in rapid response to changes in temperature of said heat-collector structure.

9. A fast response thermal switch comprising an integral heat-collector structure of stiff heat-conducting metal including a base plate portion of uniform thickness and an integral tubular portion of uniform wall thickness projecting from a face of said base plate portion and spaced from the periphery thereof, a protective body including a molded hollow end portion of stiff heat-insulating plastic material united with said base plate portion at its periphery and entirely surrounding the projecting tubular portion in laterally spaced relation thereto, said protective body including said end portion thereof having a lower heat conductivity than that of said base plate portion, a thermally responsive means including an electrically conductive thermally expansive material disposed within said projecting hollow portion in intimate heat-transferring relation thereto and within said protective body, and a first and a second electrical conductor means carried by said protective body and having portions extending at spaced-apart positions into the path of said thermally expansive material for contact therewith, said first and second electrical conductor means and said thermally responsive means constitute an electrical circuit through the switch and make and break such electrical circuit in rapid response to changes in temperature of said heat-collector structure.

References Cited in the file of this patent

UNITED STATES PATENTS

| | | |
|---|---|---|
| 1,500,566 | Hynes | July 8, 1924 |
| 2,192,960 | Bokovoy | Mar. 12, 1940 |
| 2,311,087 | Sandell | Feb. 16, 1943 |
| 2,393,635 | Hubbard | Jan. 29, 1946 |
| 2,740,035 | Young | Mar. 27, 1956 |
| 2,743,347 | Porter | Apr. 24, 1956 |
| 2,745,925 | Liberatore et al. | May 15, 1956 |
| 2,806,122 | Thunander | Sept. 10, 1957 |

UNITED STATES PATENT OFFICE
CERTIFICATE OF CORRECTION

October 13, 1959

Patent No. 2,908,792

Frank Doane Snyder

It is hereby certified that error appears in the printed specification of the above numbered patent requiring correction and that the said Letters Patent should read as corrected below.

Column 3, line 66, for "supprt" read -- support --; column 7, line 75, after "being" insert -- of --; column 11, line 51, for "extirely" read -- entirely --.

Signed and sealed this 19th day of April 1960.

(SEAL)
Attest:

KARL H. AXLINE
Attesting Officer

ROBERT C. WATSON
Commissioner of Patents